(12) United States Patent
Schmidt et al.

(10) Patent No.: US 7,046,903 B2
(45) Date of Patent: May 16, 2006

(54) LIGHT-GUIDE BODY AND PROCESS FOR ITS PRODUCTION

(75) Inventors: Jann Schmidt, Darmstadt (DE); Guenther Ittmann, Gross-Umstadt (DE); Hans Lichtenstein, Reinheim (DE); Herbert Groothues, Weiterstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 268 days.

(21) Appl. No.: 10/488,252

(22) PCT Filed: Oct. 16, 2002

(86) PCT No.: PCT/EP02/11547

§ 371 (c)(1),
(2), (4) Date: Mar. 11, 2004

(87) PCT Pub. No.: WO03/042290

PCT Pub. Date: May 22, 2003

(65) Prior Publication Data

US 2004/0264159 A1    Dec. 30, 2004

(30) Foreign Application Priority Data

Nov. 16, 2001 (DE) ................. 101 56 068

(51) Int. Cl.
*G02B 6/10* (2006.01)
*F21V 8/00* (2006.01)

(52) U.S. Cl. .............. 385/143; 385/129; 385/146; 362/582

(58) Field of Classification Search ............ 385/129, 385/130, 141–146; 362/551, 582
See application file for complete search history.

(56) References Cited

U.S. PATENT DOCUMENTS

| 4,773,913 A | 9/1988 | Krieg et al. .................. 8/552 |
| 4,957,987 A | 9/1990 | Krieg et al. ................ 526/258 |
| 5,449,727 A | 9/1995 | Krieg et al. ................ 526/273 |
| 5,621,028 A | 4/1997 | Lichtenstein et al. ......... 524/91 |

(Continued)

FOREIGN PATENT DOCUMENTS

EP    0 573 051    12/1993

(Continued)

OTHER PUBLICATIONS

U.S. Appl. No. 10/488,252, filed Mar. 11, 2004, Schmidt et al.
U.S. Appl. No. 10/501,925, filed Jul. 28, 2004, Schmidt et al.
U.S. Appl. No. 10/553,967, filed Oct. 19, 2005, Lichtenstein et al.

(Continued)

*Primary Examiner*—John D. Lee
(74) *Attorney, Agent, or Firm*—Oblon, Spivak, McClelland, Maier & Neustadt, P.C.

(57) ABSTRACT

The present invention relates to a light-guide body, which has at least one light-entry surface and at least one light-exit surface, the ratio of the light-exit surface area to the light-entry surface area being at least 4, comprising at least one light-guiding layer with a thickness of at least 2 mm, characterized in that the light-guiding layer comprises at least 60% by weight, expressed in terms of the weight of the light-guiding layer, of polymethyl methacrylate and from 0.001 to 0.08% by weight, expressed in terms of the weight of the light-guiding layer, of spherical barium sulphate particles with an average diameter in the range of from 0.3 to 20 μm.

13 Claims, 2 Drawing Sheets

U.S. PATENT DOCUMENTS

Figure 1:
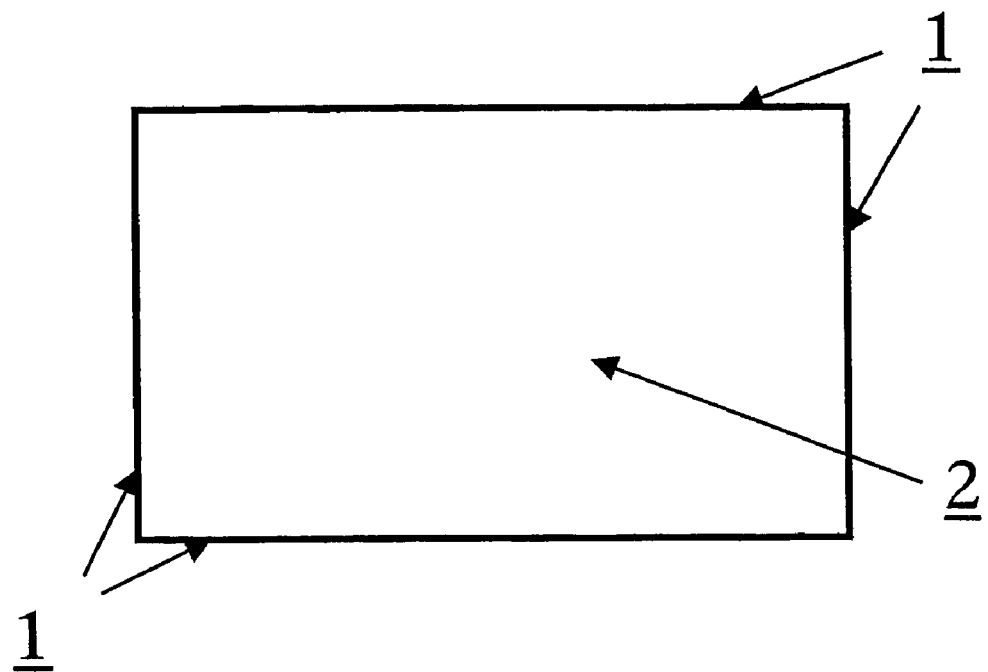

| | | | |
|---|---|---|---|
| 5,710,856 A * | 1/1998 | Ishii et al. | 385/146 |
| 6,875,499 B1 * | 4/2005 | De Toffol et al. | 428/212 |
| 2005/0002189 A1 | 1/2005 | Lichtenstein et al. | 362/231 |

FOREIGN PATENT DOCUMENTS

| | | |
|---|---|---|
| EP | 1 022 129 | 7/2000 |
| WO | 97/01726 | 1/1997 |

OTHER PUBLICATIONS

U.S. Appl. No. 10/521,769, filed Jan. 9, 2005, Lichtenstein et al.

U.S. Appl. No. 10/492,362, filed Apr. 13, 2004, Lichtenstein et al.

* cited by examiner

LIGHT-GUIDE BODY AND PROCESS FOR ITS PRODUCTION

The present invention relates to light-guide bodies, which have at least one light-entry surface and at least one light-exit surface as well as a 2 mm thick light-guiding layer, the ratio of the light-exit surface area to the light-entry surface area being at least 4.

Such light-guide bodies are known per se. For instance, a transparent plate may be provided with notches at which light is extracted normal to the propagation direction. Such light-guide bodies are the subject of EP 800 036. The application of notches is expensive, however, so that alternatives are sought.

In addition, light-guide bodies which use polymer particles as scattering bodies are known from EP 656 548. The problem with these light-guide bodies is their weathering resistance. In particular, intense UV radiation decomposes the plastic particles, so that UV radiation leads to a yellow tinge. This yellow tinge is in turn very critical for use as a light-guide body, since a nonuniform colour impression is obtained.

Furthermore, light-guide bodies which have a particle-free light-guiding layer made of polymethyl methacrylate, onto which a diffusely configured layer is applied, are known from EP 1022129. The diffusely configured layer, which has a thickness in the range of from 10 to 1500 μm, comprises barium sulphate particles. According to this principle, the light is guided via the PMMA layer, the extraction taking place through the diffuse layer. However, the light extraction can scarcely be controlled since only the light normal to the propagation direction, which has penetrated the interface with the diffusely configured layer, is scattered. Therefore, this does not involve perturbation inside the light-guiding layer, but rather diffuse back-reflection. In addition, the reduction in the light intensity is very great, as substantiated by the examples.

This entails a low luminance at large range from the light source, which is insufficient for many applications. The low brightness at a sizeable distance from the light source of the light-guide body according to EP 1022129 furthermore leads to a high sensitivity with respect to the formation of scratches on the exit surface for the light. Such scratches can be produced both by weathering and by mechanical action. The fact that these scratches scatter the light is problematic in this case. The teaching of EP 800 036 is based on this principle. These defects are not particularly noticeable at a high level of light extraction. At low brightnesses, however, they are seen as a perturbation.

In view of the prior art cited and discussed here, it was therefore an object of the present invention to provide light-guide bodies which have special weathering resistance. In this case, the light-guide bodies should permit light extraction which can be adapted to requirements, without notches needing to be applied to the plate.

Furthermore, the luminance should be as constant as possible over the entire area of the light-exit surface.

It was another object of the invention for the light-guide bodies to have a high durability, in particular a high resistance to UV radiation.

It was, in addition, an object of the invention to provide light-guide bodies which can be produced in a particularly straightforward way. For instance, it should be possible to produce the light-guide bodies in particular by extrusion, injection moulding and by casting processes.

Furthermore, it was therefore an object of the present invention to provide light-guide bodies which can be produced inexpensively.

It was furthermore an object of the present invention to provide light-guide bodies which exhibit outstanding mechanical properties. This property is, in particular, important for applications in which the light-guide body needs to have high stability against impact.

It was another object of the present invention to provide light-guide bodies which can readily be matched to requirements in terms of size and shape.

These objects and others which, although not actually mentioned explicitly, can be inferred as obvious from the contexts discussed here or necessarily result therefrom, are achieved by the light-guide bodies described in claim 1. Expedient refinements of the light-guide bodies according to the invention are protected in the dependent claims referring to claim 1.

With respect to the production process, claims 11 and 12 provide a solution to the underlying object.

The fact that the light-guiding layer of a light-guide body comprises at least 60% by weight, expressed in terms of the weight of the light-guiding layer, of polymethyl methacrylate and from 0.001 to 0.08% by weight, expressed in terms of the weight of the light-guiding layer, of spherical barium sulphate particles with an average diameter in the range of from 0.3 to 20 μm, and the light-guide body, comprising at least one light-guiding layer having a thickness of at least 2 mm, has at least one light-entry surface and at least one light-exit surface, the ratio of the light-exit surface area to the light-entry surface area being at least 4, makes it possible to produce light-guide bodies which have a particularly high resistance to weathering effects.

The measures according to the invention provide, inter alia, the following advantages in particular:

The light-guide bodies of the present invention can be produced in a particularly straightforward way. For instance, the light-guide bodies can be produced by extrusion, injection moulding and by casting processes.

The light-guide bodies according to the invention exhibit a high resistance to UV radiation.

In addition, light-guide bodies according to the invention exhibit a particularly uniform distribution of the luminance. In this case, light-guide bodies of differing size can be produced without the light-density distribution being critical to a particular extent.

Furthermore, the light-guide bodies of the present invention exhibit a particularly constant-colour light, so that no yellow impression is incurred with increasing distance from the light source.

The brightness of the light-guide bodies can be adapted to requirements.

The light-guide bodies of the present invention have good mechanical properties.

The light-guiding layer of the light-guide body according to the present invention has from 0.001 to 0.08, preferably from 0.001 to 0.06 and particularly preferably from 0.001 to 0.04% by weight, expressed in terms of the weight of the light-guiding layer, of spherical barium sulphate particles.

The term "spherical" in the scope of the present invention denotes that the particles preferably have a ball-shaped configuration, although it is obvious to the person skilled in the art that particles with another configuration may be obtained owing to the production methods, or that the shape of the particles may deviate from the ideal ball configuration.

Accordingly, the term "spherical" means that the ratio of the largest dimension of the particles to the smallest dimension is at most 4, preferably at most 2, these dimensions being respectively measured through the centre of mass of the particles. Advantageously, at least 70%, particularly preferably at least 90%, expressed in terms of the number of particles, are spherical.

The barium sulphate particles have an average diameter (weight average), in the range of from 0.3 to 20 μm, preferably from 0.7 to 6 μm, in particular in the range of from 1.4 to 3.5 μm. More favourably, 75% of the particles are in the range of from 0.3 to 6 μm. The particle size is determined by means of an X-ray sedigraph. In this case, the settling behaviour of barium sulphate in the gravitational field is studied by means of X-rays. The particle size is deduced with the aid of the X-ray transparency (the principle of the absorption of x-rays is used to determine directly the changes in the mass concentration when particles in a liquid sedimentate according to Stokes' law).

Barium sulphate particles which have the aforementioned properties are known per se, and they are commercially available, inter alia, from Sachtleben Chemie GmbH, D-47184 Duisburg. Various production methods are furthermore known.

According to a particular aspect of the present invention, these particles are uniformly distributed in the plastic matrix, without significant aggregation or congregation of the barium sulphate particles taking place. "Uniformly distributed" means that the concentration of barium sulphate inside the plastic matrix is essentially constant. According to the way in which the plastic body is produced, various methods for guaranteeing this distribution of the particles in the plastic matrix are known to the person skilled in the art. If the light-guiding layer is produced according the casting process, then, for example, agents may be added which prevent settling of the barium sulphate and hence guarantee a fine distribution. If the light-guiding layer is produced from thermoplastically formable polymethyl methacrylate, then known deflocculants may be added to the moulding materials.

According to the invention, the light-guiding layer comprises at least 60% by weight, expressed in terms of the weight of the light-guiding layer, of polymethyl methacrylate.

These polymers are generally obtained by radical polymerization of mixtures which contain methyl methacrylate. In general, these mixtures contain at least 40% by weight, preferably at least 60% by weight and particularly preferably at least 80% by weight, expressed in terms of the weight of the monomers, of methyl methacrylate.

In addition, these mixtures may contain further (meth)acrylates, which are copolymerizable with methyl methacrylate. The expression "(meth)acrylates" covers methacrylates and acrylates and mixtures of the two.

These monomers are widely known. They include, inter alia, (meth)acrylates which are derived from saturated alcohols, for example methyl acrylate, ethyl (meth)acrylate, propyl (meth)acrylate, n-butyl (meth)acrylate, tert.-butyl (meth)acrylate, pentyl (meth)acrylate and 2-ethylhexyl (meth)acrylate;

(meth)acrylates which are derived from unsaturated alcohols, for example oleyl (meth)acrylate, 2-propinyl (meth)acrylate, allyl (meth)acrylate, vinyl (meth)acrylate;

aryl (meth)acrylates, such as benzyl (meth)acrylate or phenyl (meth)acrylate, in which case the aryl radicals may be unsubstituted or substituted up to four times;

cycloalkyl (meth)acrylates, such as 3-vinyl-cyclohexyl (meth)acrylate, bornyl (meth)acrylate;

hydroxyalkyl (meth)acrylates, such as 3-hydroxypropyl (meth)acrylate, 3,4-dihydroxybutyl (meth)-acrylate, 2-hydroxyethyl (meth)acrylate, 2-hydroxypropyl (meth)acrylate;

glycol di(meth)acrylates, such as 1,4-butanediol (meth)acrylate, (meth)acrylates of ether-alcohols, such as tetrahydrofurfuryl (meth)acrylate, vinyloxy ethoxyethyl (meth)acrylate;

amides and nitriles of (meth)acrylic acid, such as N-(3-dimethylaminopropyl) (meth)acrylamide, N-(diethylphosphono) (meth)acrylamide, 1-methacryloylamido-2-methyl-2-propanol;

methacrylates containing sulphur, such as ethylsulfinyl (meth)acrylate, 4-thiocyanatobutyl (meth)-acrylate, ethylsulfonyl ethyl (meth)acrylate, thiocyanato-methyl (meth)acrylate, methylsulfinyl methyl (meth)-acrylate, Bis((meth)acryloyloxyethyl) sulphide;

polyvalent (meth)acrylates, such as trimethyloyl-propane tri(meth)acrylate.

Besides the (meth)acrylates presented above, the compositions to be polymerized may also have other unsaturated monomers which are copolymerizable with methyl methacrylate and the aforementioned (meth)acrylates.

These include, inter alia, 1-alkenes, such as hex-1-ene, hept-1-ene; branched alkenes, for example vinyl cyclohexane, 3,3-dimethyl-1-propene, 3-methyl-1-diiso-butylene, 4-methylpent-1-ene;

acrylonitrile; vinyl esters, such as vinyl acetate; styrene; substituted styrenes with an alkyl substituent in the side chain, for example the α-methyl styrene and α-ethyl styrene, substituted styrenes with an alkyl substituent in the ring, such as vinyl toluene and p-methyl styrene, halogenated styrenes, for example monochloro-styrenes, dichlorostyrenes, tribromostyrenes and tetra-bromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinyl pyrimidine, vinyl piperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolan, vinylfuran, vinylthiophene, vinylthiolane, vinylthiazoles and hydrogenated vinylthiazoles, vinyloxazoles and hydrogenated vinyloxazoles;

vinyl and isoprenyl ether; maleic acid derivatives, for example maleic anhydride, methylmaleic anhydride, maleimide, methylmaleimide; and dienes, for example divinylbenzene.

In general, these comonomers will be used in an amount of from 0 to 60% by weight, preferably 0 to 40% by weight and particularly preferably 0 to 20% by weight, expressed in terms of the weight of the monomers, and the compounds may be used individually or as a mixture.

The polymerization is generally started using known radical initiators. The preferred initiators include, inter alia, the azo initiators widely known in the specialist field, such as AIBN, and 1,1-azobiscyclohexane carbonitrile, as well as peroxy compounds, such as methyl ethyl ketone peroxide, acetylacetone peroxide, dilauryl peroxide, tert.-butyl per-2-ethylhexanoate, ketone peroxide, methylisobutyl ketone peroxide, cyclohexanone peroxide, dibenzoyl peroxide, tert.-butyl peroxybenzoate, tert.-butyl peroxyisopropyl carbonate, 2,5-Bis(2-ethylhexanoylperoxy)-2,5-dimethylhexane, tert.-butylperoxy-2-ethylhexanoate, tert.-butylperoxy-3,5,5-trimethyl-hexanoate, dicumyl peroxide, 1-1-Bis(tert.-butyl-peroxy)cyclohexane, 1-1-Bis(tert.-butylperoxy)

3,3,5-trimethylcyclohexane, cumylhydroperoxide, tert.-butyl hydroperoxide, Bis(4-tert.-butylcyclohexyl) peroxydicarbonate, mixtures of two or more of the aforementioned compounds with one another, as well as mixtures of the aforementioned compounds with unnamed compounds which can likewise form radicals.

These compounds are often used in an amount of from 0.01 to 10% by weight, preferably from 0.5 to 3% by weight, expressed in terms of the weight of the monomers.

In this case, it is possible to use various poly(meth)acrylates which differ, for example, by molecular weight or monomer composition.

In addition, the moulding materials may contain further polymers in order to modify the properties. These include, inter alia, polyacrylonitriles, polystyrenes, polyethers, polyesters, polycarbonates and polyvinyl chlorides. These polymers may be used individually or as a mixture, and copolymers which are derived from the aforementioned polymers may also be added to the moulding materials.

Such particularly preferred moulding materials are commercially available under the brand name PLEXIGLAS® from the company Röhm GmbH.

The weight average of the molecular weight $M_W$ of the homo- and/or copolymers to be used according to the invention as matrix polymers can vary in wide ranges, the molecular weight usually being matched to the task and the method of processing of the moulding material. In general, however, it is in the range of between 20,000 and 1,000,000 g/mol, preferably 50,000 to 500,000 g/mol and particularly preferably from 80,000 to 300,000 g/mol, but without thereby implying any limitation.

After addition of the barium sulphate particles, light-guiding layers can be produced from these moulding materials by conventional thermoplastic shaping methods. These include, in particular, extrusion and injection moulding.

The light-guiding layers of the present invention may furthermore be produced by casting processes. In this case, suitable acrylic resin mixtures are placed in a mould and polymerized.

A suitable acrylic resin comprises, for example,

A) 0.001–0.08% by weight of spherical barium sulphate particles with an average diameter in the range of from 0.7 to 6 μm,
B) 40–99.999% by weight of methyl methacrylate,
C) 0–59.999% of comonomers,
D) 0–59.999% of polymers which are soluble in (B) or (C), the components A) to D) adding up to 100%.

The acrylic resin furthermore has the initiators needed for polymerization. The components A to D and the initiators correspond to the compounds which are also used for the production of suitable polymethyl methacrylate moulding materials.

For curing, the so-called casting chamber method may be used, for example (see, for example, DE 25 44 245, EP-B 570 782 or EP-A 656 548), in which the polymerization of a plastic disc takes place between two glass plates, which are sealed by a circumferential cord.

According to a particular embodiment of the present invention, the light-guiding layer has at least 70, preferably at least 80 and particularly preferably at least 90% by weight, expressed in terms of the weight of the light-guiding layer, of polymethyl methacrylate.

According to a particular aspect of the present invention, the poly(meth)acrylates of the light-guiding layer have a refractive index, measured at the Na-D line (589 nm) and at 20° C., in the range of from 1.48 to 1.54.

The moulding materials and the acrylic resins may contain customary additives of all types. These include, inter alia, antistatics, antioxidants, mould release agents, flame-proofing agents, lubricants, colorants, flow enhancers, fillers, light stabilizers and organic phosphorus compounds, such as phosphites and phosphonates, pigments, anti-weathering agents and plasticizers. The amount of additives is, however, restricted by the task. For instance, the light-guiding property of the polymethyl methacrylate layer must not be impaired too greatly by additives.

The light-guiding layer generally has a transmission in the range of from 80 to 92%, preferably from 83 to 92, but without thereby implying any limitation. The transmission may be determined according to DIN 5036.

The light-guiding layer of the light-guide body has, according to the invention, at least a thickness of 2 mm. Preferably, the thickness of the light-guiding layer is in the range of from 2 to 100 mm, particularly preferably from 3 to 20 mm.

The light-guide body of the present invention has at least one light-entry surface and at least one light-exit surface.

The term light-exit surface in this case refers to a surface of the light-guide body which is suitable for emitting light. The light-entry surface is in turn capable of receiving light into the body, so that the light-guiding layer can distribute the introduced light over the entire light-exit surface. The light-guiding layer has a thickness of at least 2 mm. The barium sulphate particles lead to extraction of the light, so that light emerges over the entire light-exit surface.

In this case, the ratio of the light-exit surface area to the light-entry surface area is at least 4, preferably at least 20 and particularly preferably at least 80.

The effect of this is that the light-guide body of the present invention differs to a great extent from known covers for illumination bodies. These covers are distinguished by the fact that the light-entry surface is formed parallel with the light-exit surface, so that both surfaces have approximately the same size.

The amount of extracted light depends on the amount of barium sulphate particles in the plastic matrix. The greater this amount is, the greater is the probability that light will be extracted from the light guide. The effect of this is that the amount of barium sulphate depends on the size of the light-exit surface. The greater the dimension of the light-guide body perpendicular to the light-entry surface is, the smaller will be the selected amount of barium sulphate particles in the light-guiding layer.

According to a preferred aspect of the present invention, the light-guide body may assume a slab-shaped configuration, the three dimensions of the body having a different size.

Figure 2:
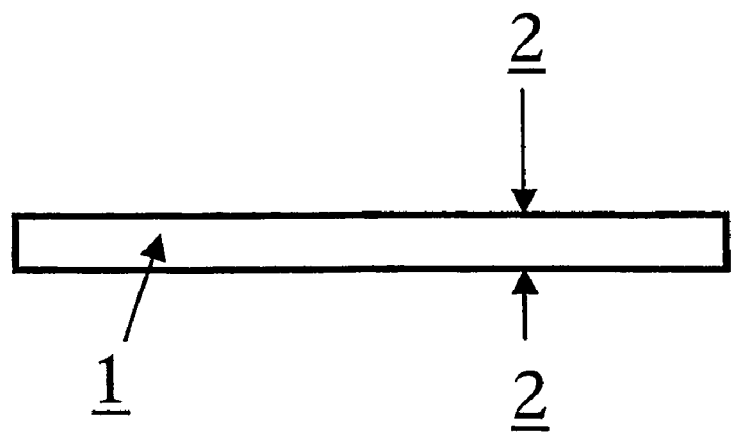

Such a slab is schematically represented, for example, in FIGS. 1 and 2. In this case, the reference number 1 denotes the edges of the slab, which may respectively be used as light-entry surfaces. Reference number 2 describes the light-exit surface of the slab.

The smallest dimension is in this case the thickness of the slab. The largest dimension is defined as length, so that the third dimension represents the width. The effect of this is that the light-exit surface of this embodiment is defined by an area which corresponds to the product of length*width. The edges of the slab, respectively defined as an area which is formed by the product of length*thickness or width*thickness, may in general be used as a light-exit surface. The edges used as a light-entry surface are advantageously polished.

Preferably such a light-guide body has a length in the range of from 25 mm to 3000 mm, advantageously from 50 to 2000 mm and particularly preferably from 200 to 2000 mm.

The width of this particular embodiment is generally in the range of from 25 to 3000 mm, preferably from 50 to 2000 mm and particularly preferably from 200 to 2000 mm.

Such a light-guide body has a thickness of more than 2 mm, advantageously in the range of from 3 to 100 mm and particularly preferably from 3 to 20. Besides these cubic versions, however, versions tapering towards one side, which have the shape of a wedge, are also conceivable. With the wedge shape, light is put in only over one light-entry surface.

Depending on the arrangement of the light sources, the light may in this case be shone in over all four edges. This may be necessary, in particular, in the case of very large light-guide bodies. For smaller light-guide bodies, one or two light sources are generally sufficient.

According to a preferred embodiment of the present invention, the light-exit surface is perpendicular to the light-entry surface.

In order to better exploit the light energy which is used, the edges which are not provided with a light source may be reflectively configured. This configuration may be obtained, for example, by using reflective adhesive tapes. A reflective coating may furthermore be applied to these edges.

According to a particular embodiment of the present invention, the light-guide body consists of the light-guiding layer, in which case the edges of the light-guiding layer may optionally be reflectively configured.

The light-guide body and the light-guiding layer have outstanding mechanical and thermal properties. These properties comprise, in particular, a Vicat softening point according to ISO 306 (B50) of at least 95° C. and a Young's modulus according to ISO 527-2 of at least 2000 MPa.

The light-guide body of the present invention may be used, in particular, for the illumination of LCD displays, information signs and advertising placards.

All known light sources may be used for illuminating the light-entry surface. Point-like incandescent lamps, for example low-voltage halogen incandescent lamps, one or more ends of light guides, one or more light-emitting diodes, as well as tubular halogen lamps and fluorescent tubes, are suitable. These may be arranged, for example, in a frame on one edge, or an edge surface or end surface of the light-guide body, at the side of the surface to be lit indirectly.

For better illumination of the light-guide body, the light sources may be provided with reflectors.

The invention will be explained in more detail below by examples and comparative examples, without thereby intending to restrict the invention to these examples.

EXAMPLE 1

Preparation of a White Paste:

5 parts by weight of polymethyl methacrylate with an n spec/C of 50–55 are dissolved in 94 parts by weight of methyl methacrylate. 1.0 part by weight of Blanc fixe N washed, from the company Sachtleben Chemie GmbH, D-47184 Duisburg, are added to this solution. This mixture is dispersed in a rotor-stator disperser (Ultra Turrax T 50 from the company Junke and Kunkel, Freiburg) at about 700 rpm up to a temperature of 55° C., and then allowed to cool to room temperature.

B) Preparation of a Polymerization Batch:

1.8% by weight of white paste is added to 98.2% by weight of MMA/PMMA syrup with approximately a 25% proportion of PMMA (n spec/C of 75). 0.075% of 2,2-azobis-(isobutyronitrile) and 0.015% of 2,2-azobis-(2,4-dimethylvaleronitrile) are added to this batch. The entire batch is stirred in a paddle mixer for approximately 30 min. The air bubbles introduced by stirring are then removed from the batch by applying a reduced pressure.

C) Preparation of a PMMA Plate with Addition of Blanc Fixe N Washed:

A chamber is made from 2 silicate glass discs (thickness 6 mm) using a PVC cord (diameter 9.6 mm). The two silicate glass discs and the PVC cord are held together by clamps. The intermediate space of the silicate glass chamber is filled with the polymerization batch described under B), and the chamber is closed. The filled chamber is placed in a water bath at a temperature of 40 to 50° C. and cured over 10 hours, the PVC cord having been removed in the end phase of the curing. The final polymerization is then carried out over 3 hours in a heat cabinet at a temperature of 115° C. Mould release is then carried out at room temperature and the plate moulding with a thickness of 8 mm is removed.

A plate strip with a length of 595 mm, a width of 84 mm and a thickness of 8 mm was cut from the plate. The plate strip was polished with a high lustre on the four edges. The two polished 595 mm long edges were provided with a reflective adhesive tape (9) from the manufacturer 3M (type: Scotch Brand 850), so that light rays which strike these edges are reflected into the plate.

Figure 3:
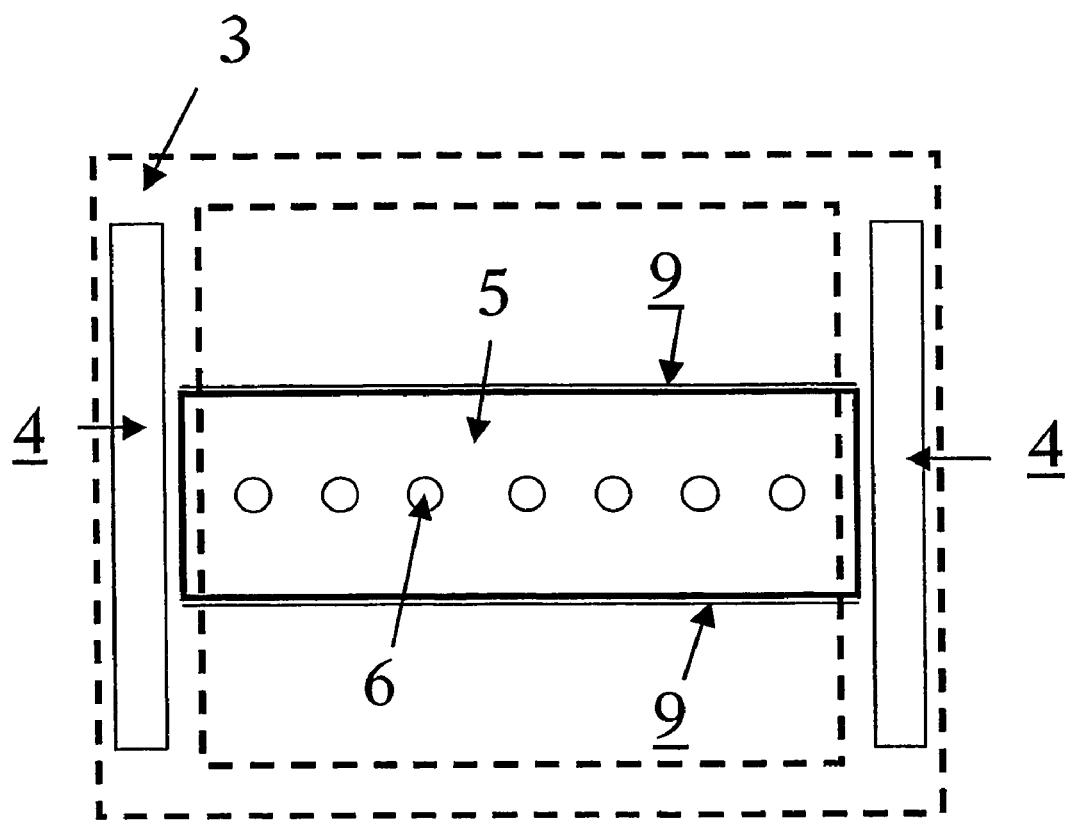
Figure 4:
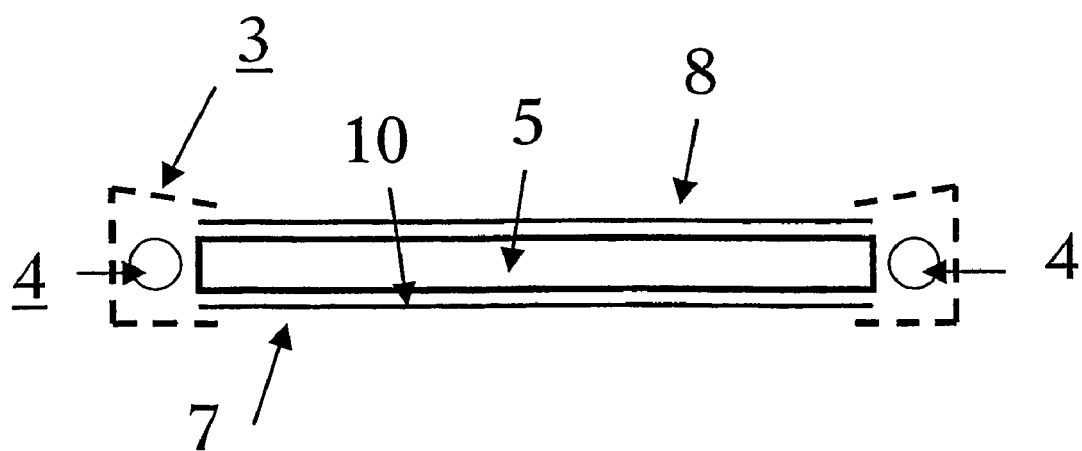

The plate strips (5) were analysed in a special measuring apparatus, which is represented in FIGS. 3 and 4. The measuring apparatus consists of a rectangular aluminium frame with a length of 708 mm and a width of 535 mm (3). Two respective fluorescent tubes (4) of the type PHILIPS TLD 15 W/4, arranged mutually parallel, are in each case fitted to the edge of the aluminium frame, which has a width of 535 mm. The spacing of the fluorescent tubes is 599 mm, and it is designed so that the plate strips can be placed centrally between the fluorescent tubes, and that the light emitted by the fluorescent tubes shines into the 84 mm wide edge of the plate strips. A plate (7) with a white reflective surface (10) is fitted below the plate strips (5). The white surface is intended to reflect, towards the observer, light which emerges from the surface of the plate strip (5) on the other side from the observer. Above the plate strips (5), facing the observer, the plate strip is provided with a diffuser film (8) with a thickness of 0.5 mm, which homogenizes the light that emerges from the plate strip in the direction of the observer. 7 measurement points (6) are marked on the diffuser film, at which the luminance is measured using a luminance meter of the type MINOLTA LUMINANCE METER 1°. The measurement points are at the following distances from one of the 84 mm long edges of the plate strip: 74 mm; 149 mm; 223 mm; 298 mm; 372 mm; 446 mm; 521 mm. The following luminances were measured.

TABLE 1

| Distance from plate edge [mm] | Luminance (plate strips with 0.018% barium sulphate) [cd/m$^2$] |
|---|---|
| 74 | 111 |
| 149 | 96 |
| 223 | 86 |
| 298 | 83 |

TABLE 1-continued

| Distance from plate edge [mm] | Luminance (plate strips with 0.018% barium sulphate) [cd/m$^2$] |
|---|---|
| 372 | 88 |
| 446 | 99 |
| 521 | 111 |

Concerning the embodiment described above, reference is made to the schematic representations in FIG. 3 and FIG. 4.

The invention claimed is:

1. A light-guide body, which has at least one light-entry surface and at least one light-exit surface, the ratio of the light-exit surface area to the light-entry surface area being at least 4, comprising at least one light-guiding layer with a thickness of at least 2 mm, wherein the light-guiding layer comprises at least 60% by weight, expressed in terms of the weight of the light-guiding layer, of polymethyl methacrylate and from 0.001 to 0.08% by weight, expressed in terms of the weight of the light-guiding layer, of spherical barium sulphate particles with an average diameter in the range of from 0.3 to 20 μm.

2. A light-guide body according to claim 1, wherein the ratio of the light-exit surface area to the light-entry surface area is at least 20.

3. A light-guide body according to claim 1, wherein the thickness of the light-guiding layer is in the range of from 3 to 100 mm.

4. A light-guide body according to claim 1, wherein the light-guide body comprises at least 90% by weight, expressed in terms of the weight of the light-guide body, of polymethyl methacrylate.

5. A light-guide body according to claim 1, wherein the barium sulphate particles have an average diameter in the range of from 1.4 to 3.5 μm.

6. A light-guide body according to claim 1, wherein the light-guiding layer comprises from 0.001 to 0.04% by weight, expressed in terms of the weight of the light-guiding layer, of spherical barium sulphate particles.

7. A light-guide body according to claim 1, wherein the polymethyl methacrylate of the light-guiding layer has a refractive index, measured at the Na-D line (589 nm) and at 20° C., in the range of from 1.48 to 1.54.

8. A light-guide body according to claim 1, wherein the light-guiding layer has a transmission, according to DIN 5036, in the range of from 75 to 92%.

9. A light-guide body according to claim 1 wherein the light-exit surface is perpendicular to the light-entry surface.

10. A light-guide body according to claim 1, wherein at least one surface, which is parallel with the light-entry surface, is configured with a reflective layer.

11. A process for producing a light-guide body according to claim 1, wherein a moulding material having at least 60% by weight, expressed in terms of the weight of the moulding material, of polymethyl methacrylate and from 0.001 to 0.08% by weight, expressed in terms of the weight of the moulding material, of spherical barium sulphate particles with an average diameter in the range of from 0.7 to 6 μm, is thermoplastically shaped.

12. A process for producing a light-guide body according to claim 1, wherein an acrylic resin comprising:

A) 0.001–0.08% by weight of spherical barium sulphate particles with an average diameter in the range of from 0.7 to 6 μm, B) 40–99.999% by weight of methyl methacrylate, C) 0–59.999% of comonomers, D) 0–59.999% of polymers which are soluble in (B) or (C), the components A) to D) adding up to 100% by weight, is radical-polymerized.

13. A device for indirect lighting, comprising at least one light-guide body according to claim 1 and a light source, which can illuminate the light-entry surface of the light-guide body.

* * * * *